United States Patent [19]

Colting

[11] Patent Number: 5,294,076
[45] Date of Patent: Mar. 15, 1994

[54] AIRSHIP AND METHOD FOR CONTROLLING ITS FLIGHT

[76] Inventor: Hakan Colting, 994 Stonehaven Avenue, Newmarket, Ontario, Canada, L3X 1P2

[21] Appl. No.: 918,126

[22] Filed: Jul. 23, 1992

Related U.S. Application Data

[63] Continuation of Ser. No. 588,774, Sep. 27, 1990, abandoned.

[51] Int. Cl.$^5$ .............................................. B64B 1/02
[52] U.S. Cl. ...................................... 244/96; 244/30; 244/127
[58] Field of Search ........................ 244/29, 30, 54, 55, 244/96, 52, 125, 126, 127, 128; 239/265.19, 265.33, 265.39

[56] References Cited

U.S. PATENT DOCUMENTS

| | | | |
|---|---|---|---|
| 607,240 | 7/1898 | Hite | 244/52 |
| 1,599,496 | 9/1926 | Sheppard | 244/52 |
| 2,191,759 | 2/1940 | Hilberth | 244/30 |
| 2,654,552 | 10/1953 | Jonas | 239/265.19 |
| 2,868,478 | 1/1959 | McCloughy | 244/52 |
| 3,265,142 | 8/1966 | Winter | 244/52 |
| 4,085,912 | 4/1978 | Slater | 244/127 |
| 4,366,936 | 1/1983 | Ferguson | 244/127 |
| 4,931,028 | 6/1990 | Jaeger et al. | 244/30 |

FOREIGN PATENT DOCUMENTS

| | | |
|---|---|---|
| 0078713 | 5/1983 | European Pat. Off. |
| 372168 | 3/1907 | France |
| 445171 | 11/1912 | France |
| 2132610 | 11/1972 | France |
| 250602 | 7/1927 | United Kingdom |

OTHER PUBLICATIONS

*Preliminary report on the engineering development of the Magnus Aerospace Corp. LTA* 20–1 *heavylift aircraft* written by J. D. DeLaurier, W. D. McKinney, W. L. Kung, G. M. Green and H. S. B. Scholaert of the University of Toronto, Institute of Aerospace Studies. Reprinted from The Aeronautical Journal of the Royal Aeronautical Society, Apr. 1983.
AIAA-85-0878—*An Investigation into the Hovering Behaviour of the LTA* 20-1 *Airship in Calm and Turbulent Air* written by J. D. Lowe of the University of Toronto, Institute for Aerospace Studies. A paper presented at the AIAA 6th Lighter-Than-Air Systems Conference held Jun. 26–28, 1985 in Norfolk, Va.
AIAA-85-0879—*An Experimental Determination of the Longitudinal Stability Properties of the LTA* 20-1 *Airship* written by J. D. Lowe, A. S. King, W. D. McKinney and D. R. Uffen of the University of Toronto, Institute for Aerospace Studies. A paper presented at the AIAA 6th Lighter-Than-Air Systems Conference held Jun. 26–28, 1985 in Norfolk, Va.
AIAA-85-0876—*Progress Report on the Engineering Development of the Magnus Aerospace LTA* 20-1 *Airship* written by J. DeLaurier, W. D. McKinney, J. D. Lower, D. R. Uffen and A. S. King of the Institute for Aerospace Studies, University of Toronto. A paper presented at the AIAA 6th Lighter-Than-Air Systems Conference held Jun. 26–28, 1985 in Norfolk, Va.
AIAA-83-2003—*Development of the Magnus Aerospace Corporation's Rotating-Sphere Airship* written by J. DeLaurier, W. E. McKinney, W. L. Kung, G. M. Green and H. S. B. Scholaert. A paper presented at the AIAA 6th Lighter-Than-Air Systems Conference held Jul. 25–27, 1983 in Anaheim, Calif.

*Primary Examiner*—Margaret A. Focarino
*Assistant Examiner*—Carla Mattix
*Attorney, Agent, or Firm*—Bereskin & Parr

[57] ABSTRACT

A non-rigid airship is provided which includes a gas envelope having propulsion units mounted on either side thereof. Thrust emanating from the propulsion units is deflectable to control at least the vertical positioning of the airship. Horizontal positioning of the airship may be controlled by varying the relative thrust of the propulsion units. A method is also provided for controlling the flight path of an airship. The method includes providing propulsion units on opposite sides of the airship and deflecting the thrust of the propulsion units to control vertical placement of the airship. Horizontal placement of the airship may be carried out by varying the relative thrust of the propulsion units.

10 Claims, 5 Drawing Sheets

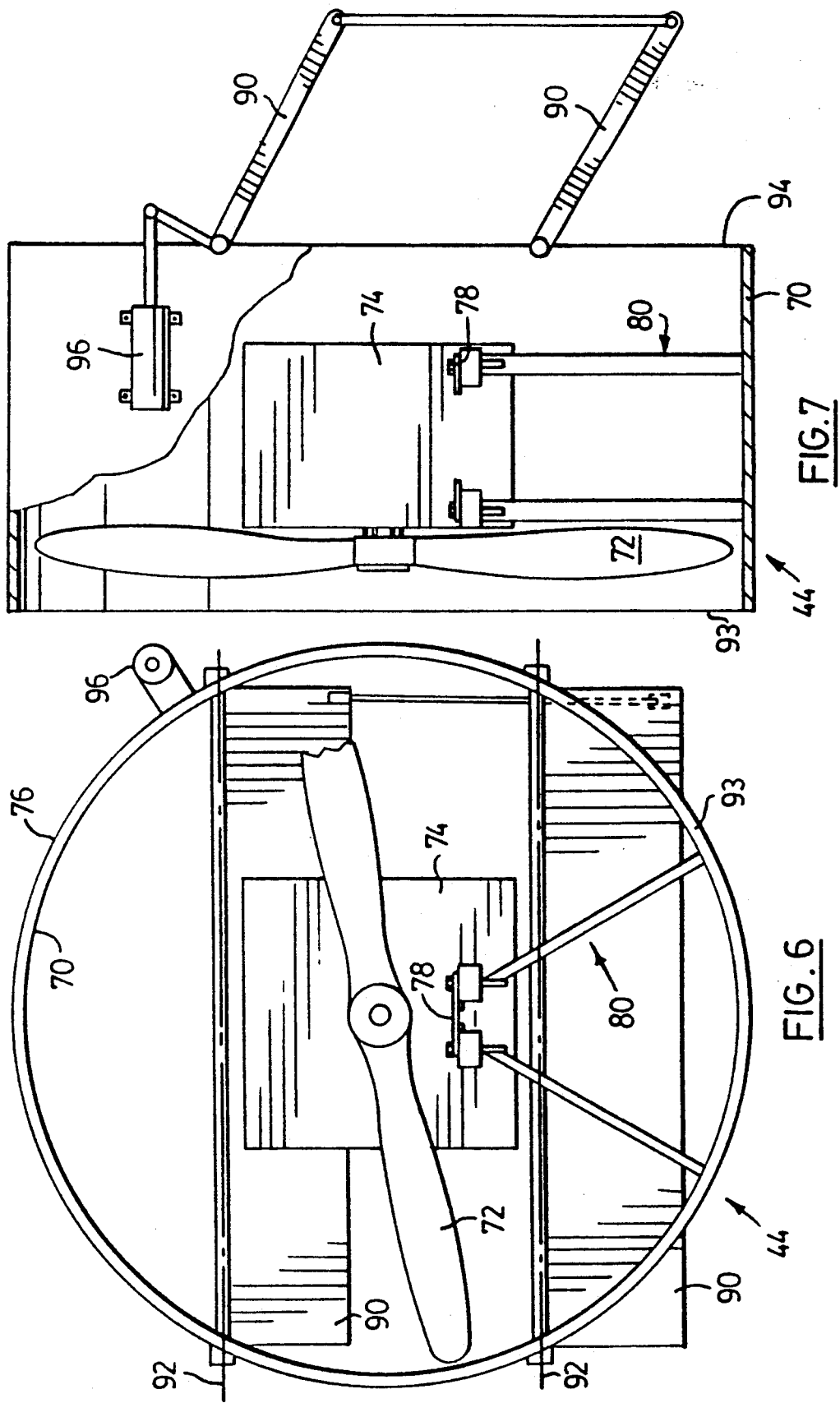

AIRSHIP AND METHOD FOR CONTROLLING ITS FLIGHT

This application is a continuation of application Ser. No. 07/588,774, filed on Sep. 27, 1990, now abandoned.

FIELD OF THE INVENTION

This invention relates to Airships and methods for controlling the flight path of such airships.

BACKGROUND OF THE INVENTION

Conventional non-rigid airships have a generally cigar shaped body which maintains its shape by means of internal gas pressure. At least a portion of the internal gas has a density less than that of the ambient air so that the airship is generally weightless. A gondola for carrying passengers is suspended beneath the body of the airship by means of suspension cables extending through the interior of the body of the airship and attached to the top portion of the airship.

Propulsion for conventional airships is provided by means of engines, one of which is usually attached to each side of the gondola. Conventional airships are further provided with control surfaces, namely rudders and elevators, toward the tail section to control vertical and horizontal positioning of the airship.

Traditionally there has not been much latitude for varying the shape of airships as the flight control mechanisms have included elevators, rudders and gondola mounted engines as described. Accordingly, such airships have required generally elongate bodies with the control surfaces mounted toward the rear in the path of the air flowing over the airship. There are situations, however, where different shapes may be preferred. One such example is in advertising. Although advertising logos may be displayed on the sides of the conventional airships, it has not been possible to make the airships in various shapes representative of various manufacturer's products. Such shapes might include beverage cans, spark plugs, etc.

A further disadvantage to the prior designs is that mounting of the propulsion engines to the gondola transmits engine vibration and noise directly into the gondola. Also, traditional airships are rather cumbersome in operation as they are normally incapable of very great speeds so that the use of control surfaces to position the airships gives a generally lazy or slow response to directional input by the pilot. The response of these airships to directional input decreases as their forward speed decreases which, in turn makes such airships difficult to control when landing except at speeds requiring a large ground crew for receiving and mooring the airship.

SUMMARY OF THE INVENTION

An airship is provided which does not require a rudder or elevators for steering and altitude control. The airship comprises: a gas envelope containing a buoyant gas; at least one pair of thrust producing propulsion units positioned on opposite sides of the gas envelope orientated generally parallel to the normally fore and aft axis of the gas envelope, each of the propulsion units providing a variable rearward horizontal airstream; steering control means adapted to steer the airship substantially exclusively by independently varying the amount of thrust of each of the propulsion units; movable thrust deflectors positioned proximally rearward of the propulsion units for deflecting the airstreams away from the horizontal; and elevation control means for controlling the altitude of the airship substantially exclusively by moving the thrust deflectors.

A method is also provided for controlling the flight of an airship having a pair of thrust producing propulsion units on opposite sides thereof, each of the propulsion units providing a variable rearward horizontal airstream. The method includes the steps of: controlling the altitude of the airship substantially exclusively by deflecting the rearward airstreams of the propulsion units away from the horizontal; and steering the airship substantially exclusively by varying the relative rearward airstreams of the propulsion units to rotate the airship about a vertical axis.

DESCRIPTION OF THE DRAWINGS

Preferred embodiments of the present invention will now be described in detail with reference to the attached drawings in which:

FIG. 6 is a front elevation of a propulsion unit for an airship according to the present invention;

FIG. 7 is a side elevation, partially cut away of the propulsion unit of FIG. 6;

DESCRIPTION OF THE PREFERRED EMBODIMENTS

Figure 1:
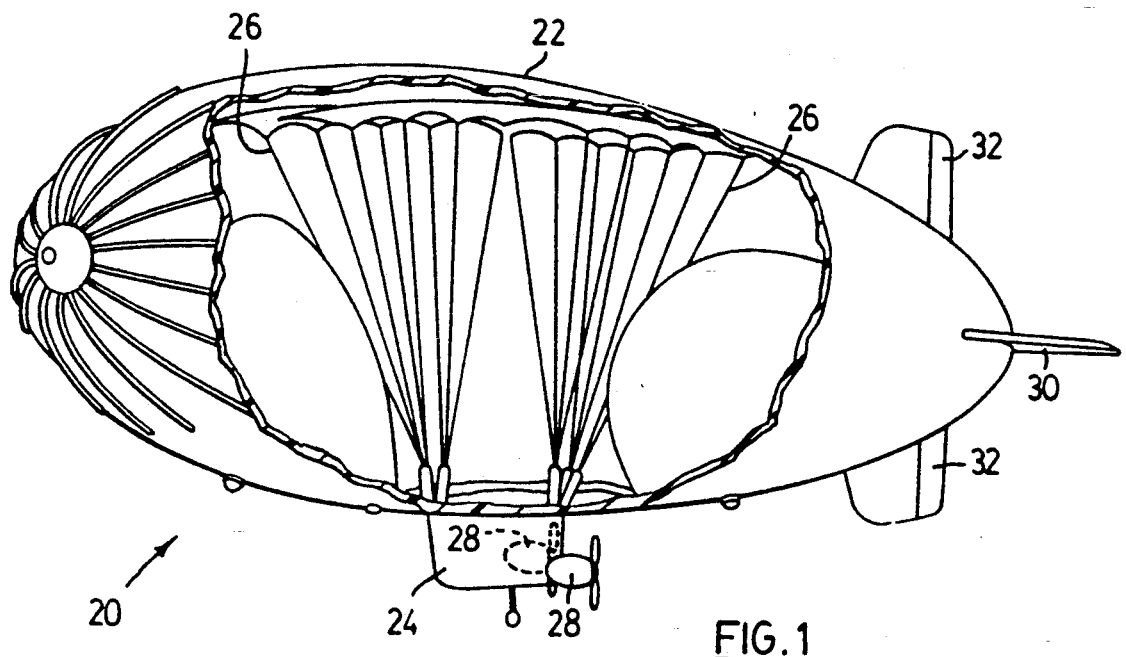
FIG. 1 is a partially cutaway perspective view of a conventional non-rigid airship.

Referring to FIG. 1, a prior art non-rigid airship is generally identified by reference 20. The airship 20 has a generally cigar shaped body defined by an envelope 22. A gondola 24 is suspended beneath the airship 20 by means of suspension cables 26 extending through the interior of the envelope 22. Forward propulsion for the airship is provided by a pair of engines 28, one on either side of the gondola 24.

Altitude of the airship 20 in FIG. 1 is mainly controlled by elevators 30 toward the rear of the airship. Rudders 32 are used to control the direction of the airship 20. It will be appreciated that the amount of altitude and directional control of an airship such as the airship 20 in FIG. 1 will be determined largely by the velocity of air passing across the rudders 32 and 30 elevators as it is the air impingement on the rudders 32 and elevators 30 which causes respective lateral and vertical movement of the airship 20.

Figure 2:
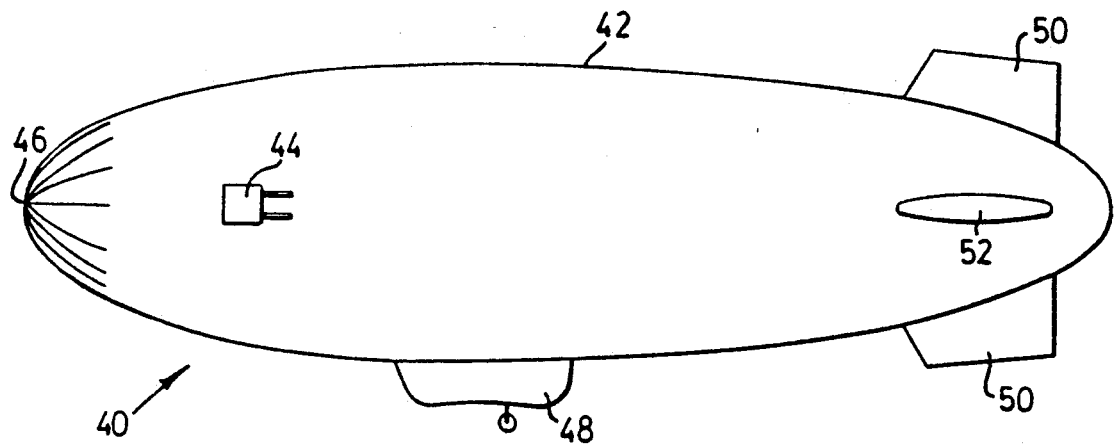
FIG. 2 is a side elevation of an airship according to the present invention.
Figure 3:
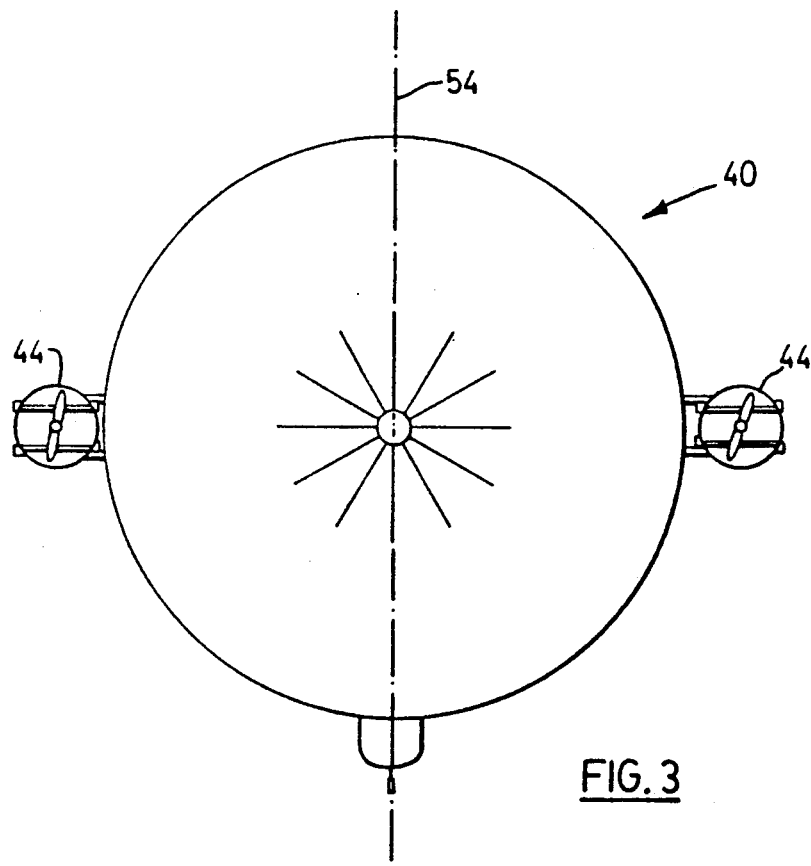
FIG. 3 is an end elevation of an airship according to the present invention.

FIGS. 2 and 3 show an airship 40 according to the present invention. Although a non-rigid airship is described in this detailed description, it will be appreciated by those skilled in the art of airships that the teachings of the present invention may also be applied to semi-rigid or rigid airships.

The airship 40 has a gas envelope 42 which defines its general shape. The airship 40 has a pair of propulsion units 44, one on either side of the gas envelope 42, at generally diametrically opposed locations toward the front 46 of the airship 40 about one third of the way along the length of the airship 40. The position of the propulsion units 44 may vary depending on what the airship 40 is used for and, accordingly, how it is to be loaded and therefore balanced.

Figure 4:
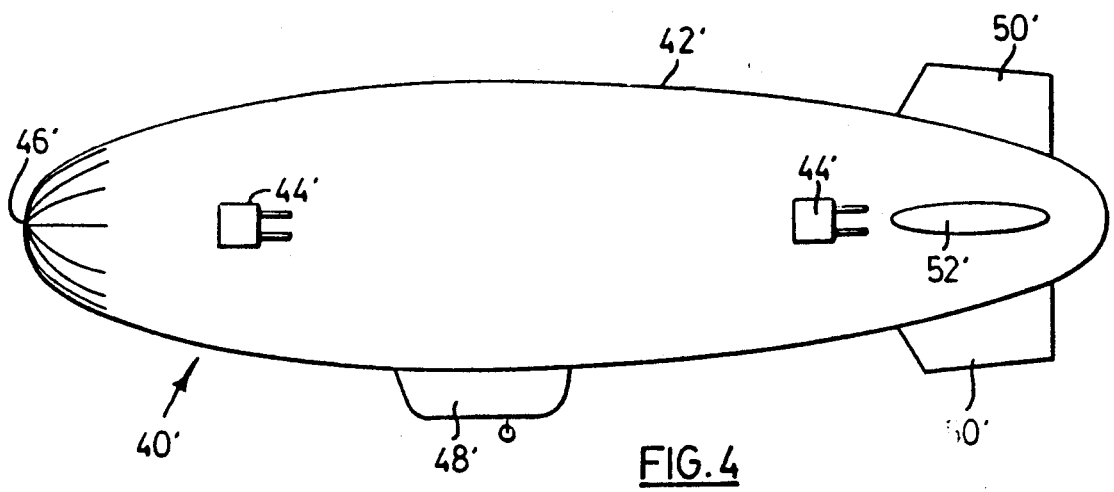
FIG. 4 is a side elevation of a further embodiment of an airship according to the present invention.
Figure 5:
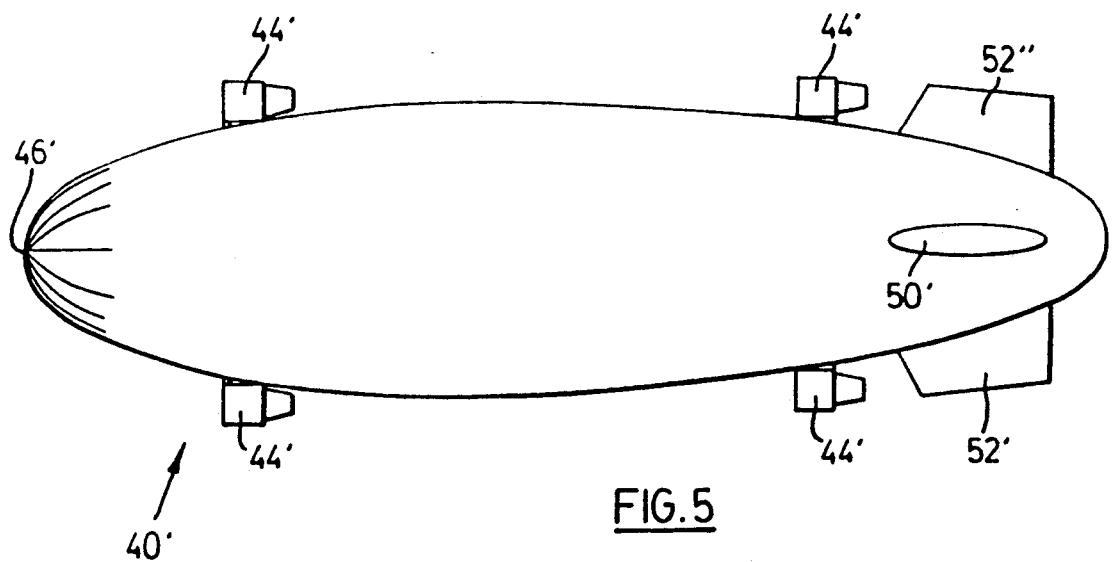
FIG. 5 is a top plan view of the airship of FIG. 4.

FIGS. 4 and 5 show an airship similar to that of FIGS. 2 and 3, with primed reference numerals indicating similar components. The airship 40' of FIGS. 4 and 5 differs from the airship of FIGS. 2 and 3 in that pairs of propulsion units 44' are provided both toward the front third and toward the rear third of the gas envelope 42'.

The overall shape of the airships 40 in FIGS. 2 and 3 and 40' in FIGS. 4 and 5 is similar to that of the prior art airship 20 in FIG. 1. Accordingly, the airships 40 and 40' are provided with gondolas 48 and 48' respectively suspended from their undersides, however the gondolas 48 and 48' do not have engines attached to them. The airships 40 and 40' are further provided with vertical fins 50 and 50' respectively and horizontal fins 52 and 52' toward the rear of the airships 40 and 40'. The fins 50, 50', 52 and 52' are provided primarily for stability and, as will be described below, are not used in maneuvering. Accordingly, elevators and rudders are not required on the gondola design of FIGS. 2, 3, 4 and 5.

Altitude and directional control of the airships 40 and 40' of FIGS. 2, 3, 4 and 5 is provided by controlling the amount and direction of thrust of the air emanating from the propulsion units 44 and 44' respectively. The propulsion units 44 and 44' and the deflection of their respective thrust will be described in more detail below.

The altitude of the airships 40 and 40' in FIGS. 2, 3, 4 and 5 is controlled by directing thrust emanating from the propulsion units 44 and 44' downwardly to increase the altitude and upwardly, to decrease the altitude. To steer the airships 40 and 40', the thrust from the propulsion units 44 and 44' on one side of the airship 40 or 40' respectively may be increased or decreased relative to the thrust of the propulsion units 44 and 44' on the opposite side of the airship 40 or 40'. Varying the relative thrust of the propulsion units 44 or 44' will cause rotation of the airship about a generally vertical axis such as the axis 54 in FIG. 3.

Figure 10:
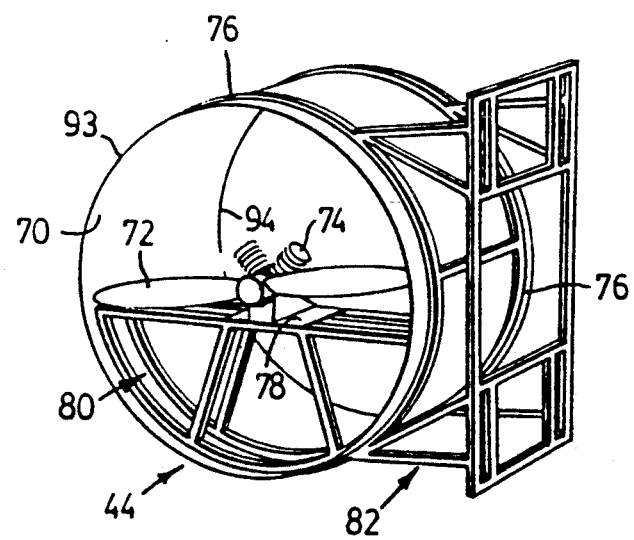
FIG. 10 is a perspective view of a propulsion unit and its mounting frame.
Figure 9:
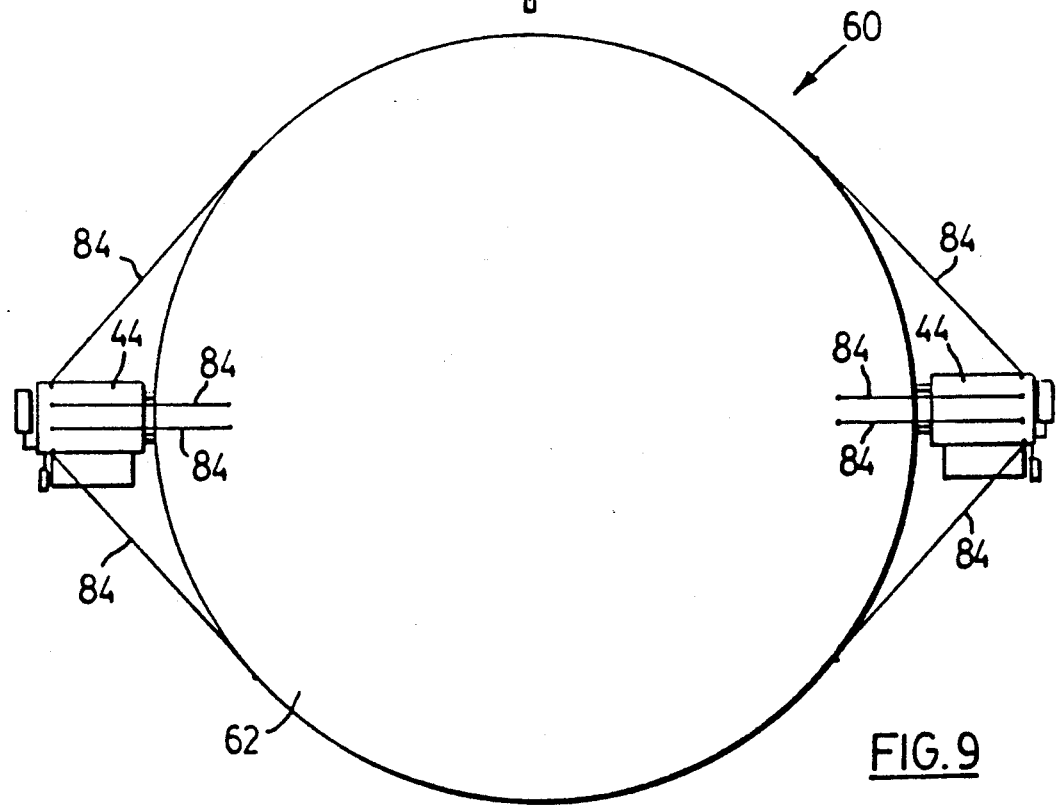
FIG. 9 is a top plan view of the airship of FIG. 8.

As the present invention provides means other than the conventional elevators and rudders, for controlling the direction and altitude of an airship, the shape of the airship is not restricted to the conventional cigar shape of the airship 20 in FIG. 1. For example, FIGS. 9 and 10 show an airship 60 having a generally spherical gas envelope 62, similar in shape to a balloon. A pair of propulsion units 44 are attached at generally diametrically opposed locations on the sides of the gas envelope 62 at about the equator of the gas envelope 62. It will be appreciated that many other shapes for a gas envelope may be used, the general requirement being that the gas envelope be able to hold a suitable amount of gas having a density less than that of the air surrounding the gas envelope.

Referring to FIGS. 6, 7 and 10, the propulsion units 44 will now be described in more detail. The propulsion units are generally a ducted fan. Accordingly, the propulsion unit has a generally cylindrical shroud 70 generally co-axial with and surrounding a propeller 72. An engine 74, which may be of internal combustion type, provides the necessary power to rotate the propeller 72. The shroud 70 may be of sheet metal and reinforced by a pair of hoops 76 extending therearound toward the ends of the shroud 70. The shroud has an inlet end 93 and an outlet end 94. The engine 74 may be mounted on a platform 78 supported inside of the shroud by a support frame 80. Portions of the support frame 80 have been omitted from FIGS. 6 and 7 to better illustrate the thrust deflection system which is described in more detail below.

Figure 8:
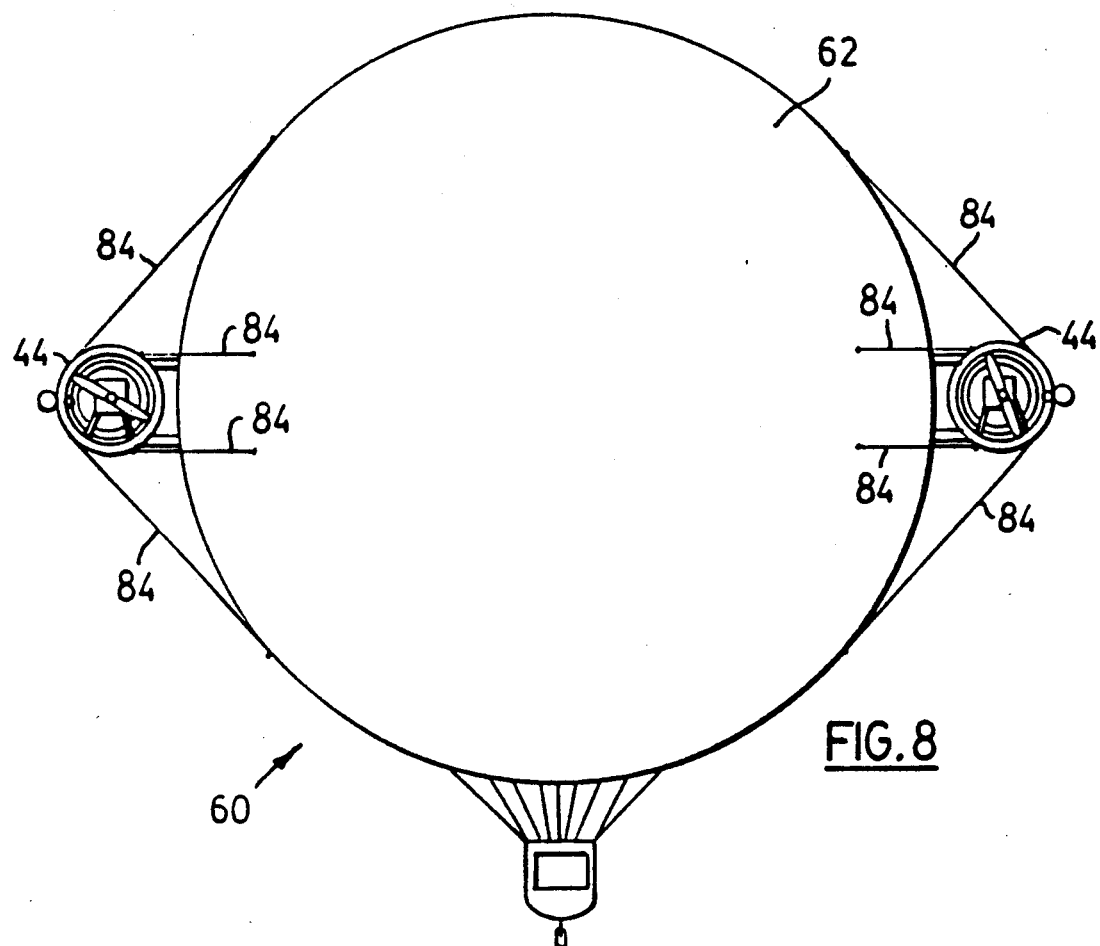
FIG. 8 is a front elevation of yet another embodiment of an airship according to the present invention.

A mounting frame 82 in FIG. 10 extends from the side of the shroud 70, attaching to the reinforcing hoops 76. The mounting frame 82 enables the propulsion unit 44 to be attached to the gas envelope of the airship. Attachment of the propulsion units 44 to the gas envelope may be accomplished with a combination of fabric, such as the type from which the gas envelope, is made and straps, wrapped around the frame 82 and secured to the gas envelope. The propulsion unit may be further supported and stabilized by wire cables such as cables 84 in FIGS. 8 and 9 which extend between the propulsion units 44 and the gas envelope.

Deflection of the thrust from the propeller 72 of the propulsion unit 44 in a vertical direction may be achieved by horizontal flaps 90 in FIGS. 6 and 7 mounted across the outlet end 94 of the shroud or duct 70 surrounding the propeller 72. The flaps 90 are rotatable about a generally horizontal axis 92 by an actuating means, namely fluid cylinder 96. It will be appreciated that other actuating means such as cables, electric motors, screw and screw followers may also be used.

It will be appreciated that as the altitudinal and directional control of the airship of the present invention is controlled by directing thrust from the propulsion units, the response of the airship to directional input will be relative to the thrust emanating from the propulsion units. As the thrust from the propulsion units may be varied by altering the speed or pitch of the propellers, maneuvering of the airship of the present invention relies less on airspeed than previous airships and accordingly the airship of the present invention should be less cumbersome at relatively low speeds.

It is intended that the above description be interpreted in an illustrative rather than a restrictive sense. Variations to the structure and operation of the airship of the present invention may be apparent to those skilled in the art of airships and their navigation. Such variations are intended to form part of the present invention insofar as they are within the spirit and scope of the appended claims. For example, although thrust deflection systems utilizing flaps or nozzles have been described, as an alternative, it may be possible to move the thrust producing propulsion unit relative to the envelope. This may be accomplished by applying force directly to the propulsion unit and causing flexion in the envelope in the attachment region. Alternatively, the propulsion unit may be swivelably mounted to the mounting frame.

I claim:

1. A method for controlling the flight of an airship having a flexible, self supporting gas envelope containing a buoyant gas and a pair of thrust producing propulsion units directly attached to said envelope and positioned on opposite sides thereof, each of said propulsion units providing a variable rearward horizontal airstream, said method including the steps of:

(1) controlling the altitude of said airship substantially exclusively by deflecting the rearward airstreams of said propulsion units away from the horizontal; and (2) steering said airship substantially exclusively by varying the relative rearward airstreams of said propulsion units to rotate said airship about a vertical axis.

2. An airship which does not require a rudder or elevators for steering and altitude control, comprising:
   a flexible, self supporting gas envelope containing a buoyant gas;
   at least one pair of thrust producing propulsion units directly attached to said envelope and positioned on opposite sides of said gas envelope oriented generally parallel to the normally fore and aft axis of the gas envelope,
   each of said propulsion units providing a variable rearward horizontal airstream;
   steering control means adapted to steer said airship substantially exclusively by independently varying the amount of thrust of each of said propulsion units;
   movable thrust deflectors positioned proximally rearward of said propulsion units for deflecting said airstreams away from the horizontal; and
   elevation control means for controlling the altitude of said airship substantially exclusively by moving said thrust deflectors.

3. An airship according to claim 2 wherein said gas envelope is inflatably self-supported.

4. An airship according to claim 3 wherein said propulsion units are mounted directly to said gas envelope in bilaterally symmetric positions.

5. An airship according to claim 4 wherein said propulsion units are mounted proximal to the normally horizontal medial plane of said gas envelope and are remote from the normally vertical axis of said gas envelope.

6. An airship according to claim 4 wherein said gas envelope is generally cigar shaped and has a first pair of propulsion units mounted to the front third of said gas envelope and a second pair of propulsion units mounted to the rear third of said gas envelope.

7. An airship according to claim 4, 5 or 6 wherein said gas envelope further includes stabilizing fins.

8. An airship according to claim 3, 4 or 5 wherein said gas envelope is generally spherical.

9. An airship according to claim 2, 3 or 4 wherein said propulsion units include an engine driven fan mounted within a duct; said duct has inlet and outlet ends; and said thrust deflectors are mounted across said outlet end.

10. An airship according to claim 2, 3 or 4 wherein said thrust deflectors comprise pivotally mounted generally horizontal flaps and wherein actuating means extending between said power unit and said flaps are provided for rotating said flaps about a generally horizontal axis.

* * * * *